United States Patent
Mertens et al.

(10) Patent No.: US 10,996,450 B2
(45) Date of Patent: May 4, 2021

(54) ARRANGEMENT OF A TIR BODY

(71) Applicant: LUMILEDS HOLDING B.V., Schiphol (NL)

(72) Inventors: Juergen Mertens, Wuerselen (DE); Astrid Marchewka, Aachen (DE); Georg Henninger, Aachen (DE)

(73) Assignee: LUMILEDS LLC, San Jose, CA (US)

( * ) Notice: Subject to any disclaimer, the term of this patent is extended or adjusted under 35 U.S.C. 154(b) by 120 days.

(21) Appl. No.: 16/084,457

(22) PCT Filed: Mar. 6, 2017

(86) PCT No.: PCT/EP2017/055139
§ 371 (c)(1),
(2) Date: Sep. 12, 2018

(87) PCT Pub. No.: WO2017/157706
PCT Pub. Date: Sep. 21, 2017

(65) Prior Publication Data
US 2019/0094507 A1    Mar. 28, 2019

(30) Foreign Application Priority Data
Mar. 15, 2016   (EP) .................................... 16160303

(51) Int. Cl.
*G02B 27/02*   (2006.01)
*G02B 27/14*   (2006.01)
*G02B 19/00*   (2006.01)
*F21S 41/24*   (2018.01)
*F21S 41/143*  (2018.01)
*F21S 41/26*   (2018.01)
(Continued)

(52) U.S. Cl.
CPC ........ *G02B 19/0019* (2013.01); *F21S 41/141* (2018.01); *F21S 41/143* (2018.01); *F21S 41/16* (2018.01); *F21S 41/24* (2018.01); *F21S 41/26* (2018.01); *F21V 7/0091* (2013.01); *G02B 19/0028* (2013.01); *G02B 19/0052* (2013.01); *G02B 19/0061* (2013.01)

(58) Field of Classification Search
CPC ............ G02B 19/0019; G02B 19/0028; G02B 19/0052; G02B 19/0061; F21S 41/24; F21S 41/26; F21S 41/16; F21S 41/143; F21S 41/141; F21V 7/0091
USPC .................. 359/726, 798–800, 630; 345/7–9
See application file for complete search history.

(56) References Cited

U.S. PATENT DOCUMENTS

| | | | |
|---|---|---|---|
| 6,819,506 B1 | 11/2004 | Taylor et al. | |
| 9,664,847 B2 * | 5/2017 | Krenn | ...................... F21S 41/43 |
| 2019/0203903 A1 * | 7/2019 | Nishimura | ............ F21S 41/663 |

FOREIGN PATENT DOCUMENTS

| | | | |
|---|---|---|---|
| EP | 2327927 B1 | 11/2012 | |
| EP | 2743569 A1 | 6/2014 | |

(Continued)

*Primary Examiner* — William Choi
(74) *Attorney, Agent, or Firm* — Volpe Koenig

(57) ABSTRACT

The invention relates to an optical device and to a headlighting assembly including an optical device. An optical device includes a body of a transparent material arranged to receive light at at least one light input portion. At least a portion of the light is reflected at an outer surface of the body due to total internal reflection. A non-transparent housing is provided to at least partially cover the body. The body is held within the housing by protrusions arranged to abut against the outer surface.

20 Claims, 2 Drawing Sheets

(51) Int. Cl.
*F21S 41/16* (2018.01)
*F21S 41/141* (2018.01)
*F21V 7/00* (2006.01)

(56) References Cited

FOREIGN PATENT DOCUMENTS

| | | |
|---|---|---|
| JP | 11084490 A | 3/1999 |
| JP | 2003-022705 A | 1/2003 |
| WO | 2005/026790 A1 | 3/2005 |
| WO | 2013/166535 A2 | 11/2013 |
| WO | 2014/184422 A1 | 11/2014 |

* cited by examiner

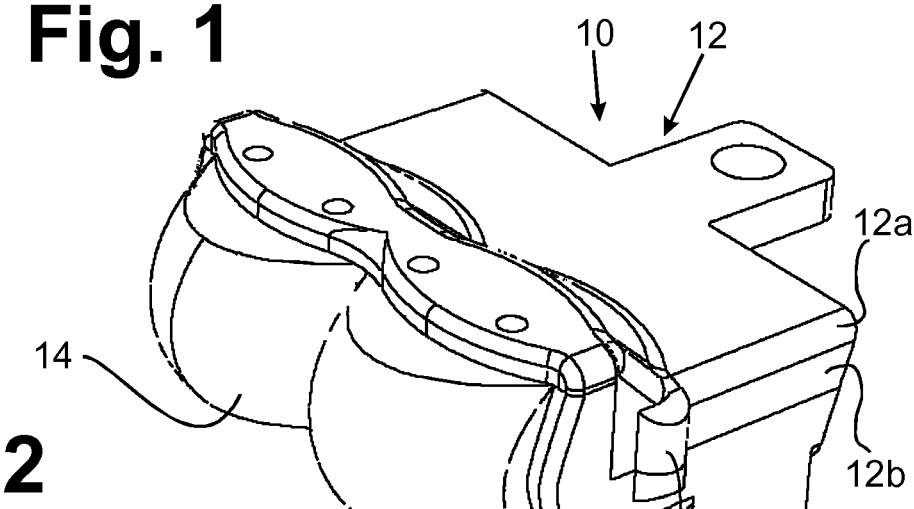
Fig. 1
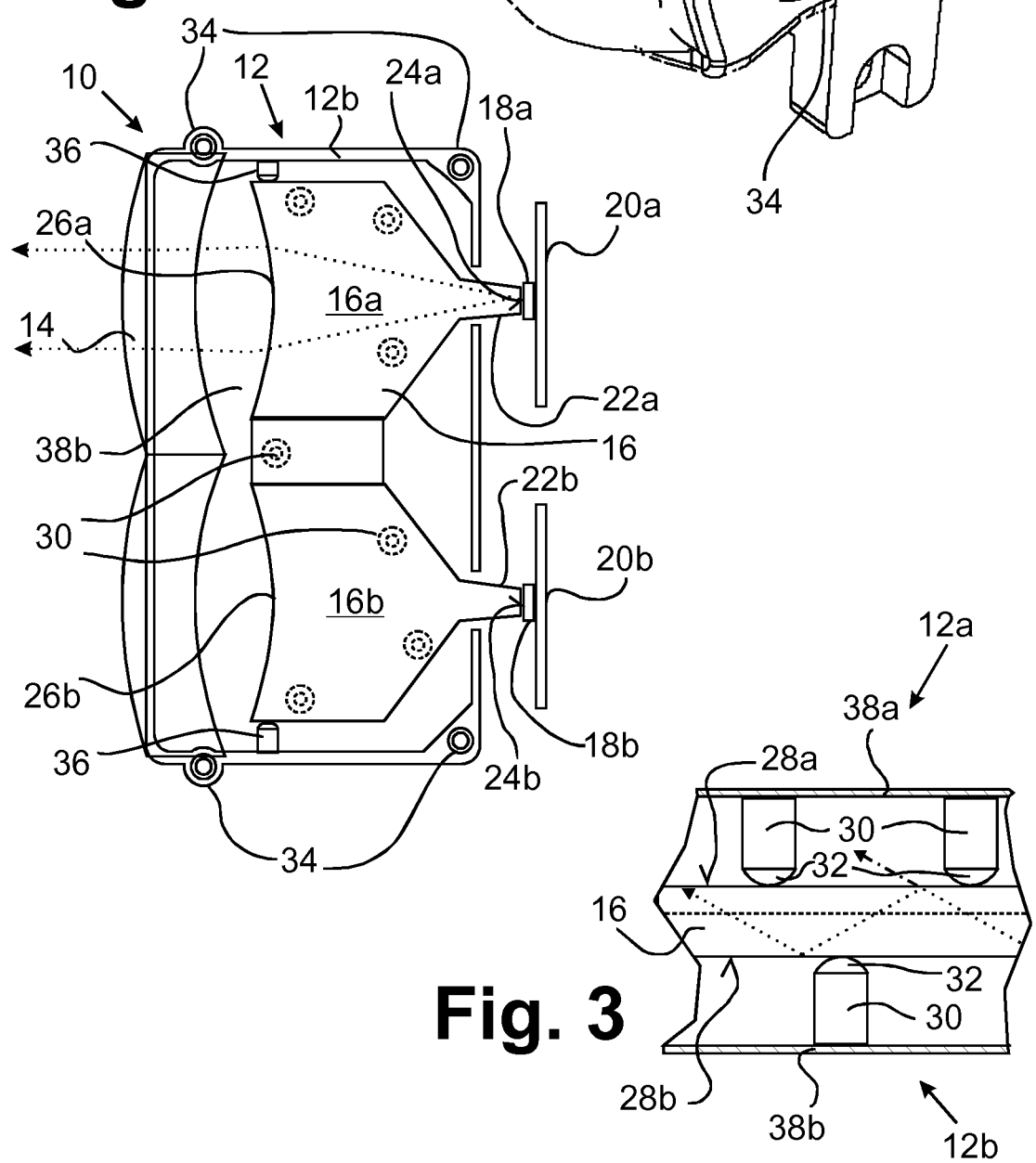
Fig. 2
Fig. 3

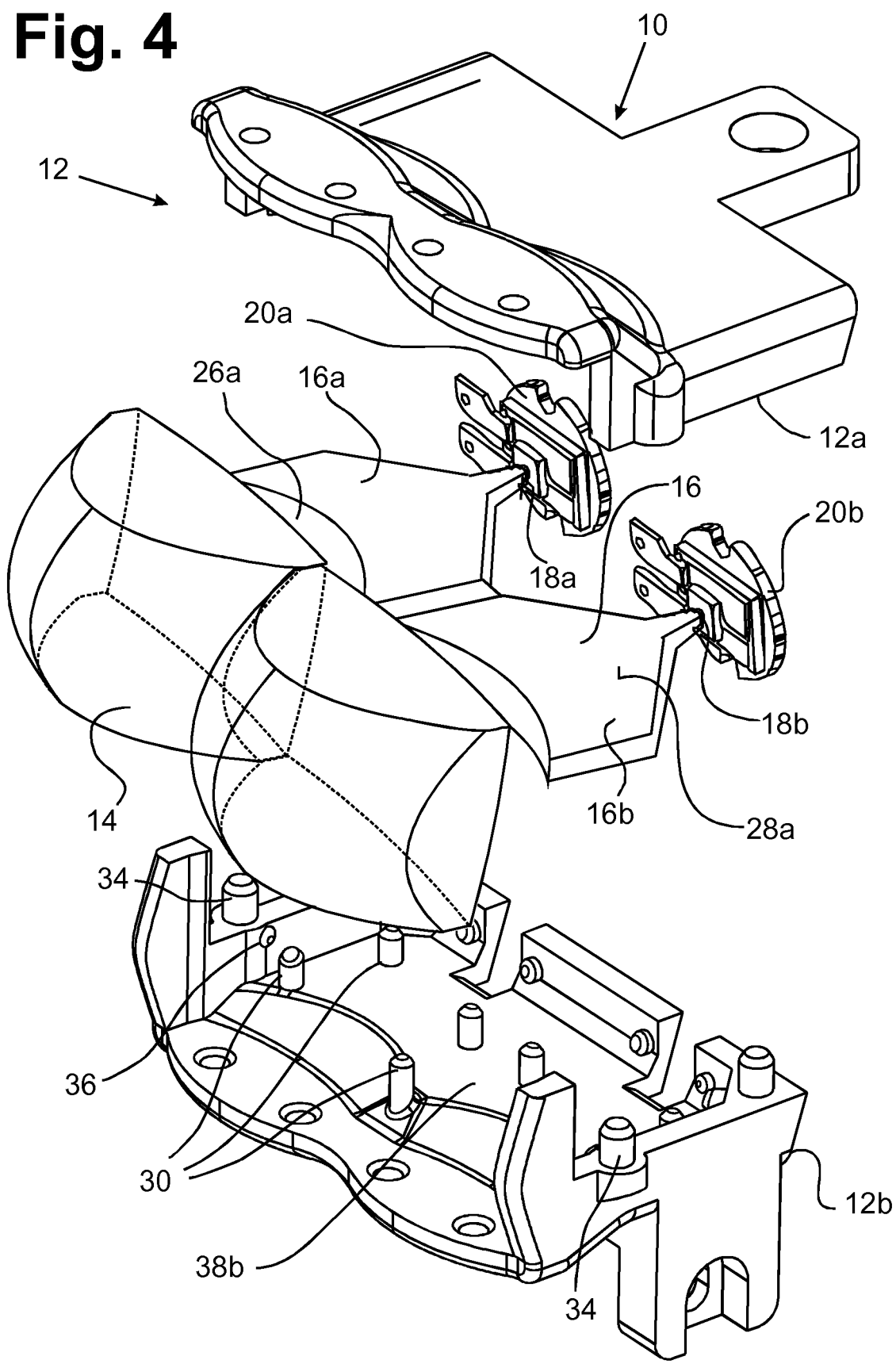

ARRANGEMENT OF A TIR BODY

FIELD OF THE INVENTION

The invention relates to an optical device and to a headlighting assembly including an optical device. In particular, the invention relates to an optical device including a reflector body of transparent material.

BACKGROUND OF THE INVENTION

Different types of optical devices are known which may receive light emitted from a light source and optically modify the light to emit an output beam of desired properties. Such optical devices may e. g. comprise an optical element such as a lens, reflector or collimator.

One known type of optical element is a TIR (total internal reflection) element, e. g. lens, reflector and/or collimator. A TIR element may be a body of an optically transparent material including a light input portion, at which light may enter the body, and a light output portion, at which light may be emitted from the interior of the body. The light is guided in the interior of the body. At outer surfaces of the body, light may be reflected based on the principle of total internal reflection due to the difference of the refractive index of the body as compared to surrounding space, e. g. air.

EP 2 327 927 B1 describes a lens element for a light source, in particular an LED. The lens element comprises a body of light conducting material with boundary surfaces. The body conducts light originating from the light source. Portions of the light are reflected as a consequence of total reflection at the boundary surfaces.

SUMMARY OF THE INVENTION

It may be considered an object to propose an optical device, and in particular a head lamp, e. g. for use in a motor vehicle, in which an optical element comprising a transparent body makes efficient use of the light of a light source.

According to an aspect of the invention, an optical device according to claim 1 and a headlighting assembly according to claim 14 are proposed. Dependent claims refer to preferred embodiments.

The optical device according to the invention includes a body of a transparent material. The body includes at least one light input portion through which light may be received to be conducted within the interior of the body.

At least a portion of the light received at the light input portion may be reflected at an outer surface of the body due to total internal reflection (TIR). The body may thus be referred to as a TIR body. The TIR body may be shaped according to a desired optical purpose, e. g. as a lens, collimator and/or reflector.

In particular, the TIR body may comprise at least one light output portion, e. g. output surface, at which light received from the light input portion and guided in the interior of the body may be transmitted to the outside of the TIR body. An optical axis may be defined e. g. between a center of a light input surface and a center of a light output surface.

The inventors have considered that in using a TIR body to transform an input beam of light into an output beam of light emitted at a light output portion, there may be scattered light portions emitted from the body at different locations and under different angles. In order to avoid a contribution of such scattered light portions to the output beam of the optical device, the inventors propose a non-transparent housing provided to at least partially cover the TIR body. The housing may be provided e. g. to partially of fully surround the body, in particular with respect to directions perpendicular to the optical axis. Thus, scattered light portions emitted from the interior of the body may be absorbed at the non-transparent housing.

According to the invention, the body is held within the housing by protrusions arranged to abut against the outer surface of the body.

The inventors have considered that any contact between the TIR body and the housing may lead to a change in the optical properties at the respective location. Since the desired effect of reflection at the outer surface of the TIR body relies on total internal reflection, any change of the refractive index of the surrounding medium and the glazing angle may lead to unwanted effects, such as transmission of light to the outside of the TIR body or reflection into undesired directions. Therefore, the luminous intensity of the light conducted within the TIR body to the light output portion may be reduced by light portions coupled out at undesired locations. Also, the beam shape of the light beam to be emitted at the light output portion of the TIR body may be distorted due to effects caused at points of contact between the housing and the TIR body.

The proposed mounting of the TIR body within the housing by protrusions abutting against the outer surface minimizes contact and thus leads to minimized distortion.

The housing may include housing walls, which may be arranged at a distance from the TIR body, e.g. in parallel to the outer surface thereof. The protrusions may extend from these housing walls to establish the distance. The protrusions may be integrally formed with the housing wall, e.g. from a plastic material.

Preferably, the body is held by abutting contact of the protrusions alone, e. g. such that the protrusions, or heads thereof, abut against the outer surface, without additional fixing of the TIR body e.g. by planar contact of a housing wall.

The points of contact between each protrusion and the outer surface may be e. g. point-shaped to minimize the contact surface. It is preferred that the protrusions are not fixed to the TIR body other than through a pressing force alone, i. e. without glue or form-locking of respective shapes.

According to preferred embodiments, the housing may comprise at least an upper and a lower housing portion, such that the TIR body is arranged between the two housing portions. In particular, the housing may be comprised of an upper and a lower half Protrusions may be arranged both at the upper and lower housing portions, extending to abut against the TIR body. The upper and lower housing portions may be connected e. g. by form-fitting elements to ensure alignment, and may be fixed to each other, e.g. by gluing, welding, or mechanical locking. For example, positioning protrusions provided at one housing portion may be received within positioning holds at the other housing portion.

Protrusions may be provided to contact the TIR body from more than one direction. Preferably, protrusions may be arranged to contact the TIR body from opposed directions, such as from above and below, from front and back, and/or from both lateral sides. For example, protrusions may extend from top and bottom portions of a housing wall as well as from side portions thereof.

The number and positioning of protrusions provided may vary according to the shape of the TIR body to be held. While in some embodiments the number of protrusions arranged at the upper and lower housing portions may be different, it may in some cases be preferred to provide the same number of protrusions on both sides. In this way, any distortion effects caused may be symmetrical.

Preferably, the body may be clamped between protrusions abutting against the outer surface at opposing sides. The term "clamped" refers to positioning of the body in a form-fitting manner so that it is rendered immobile within the housing. To avoid a change in the optical properties due to internal stress, forces pressing the protrusions against the outer surface are preferably avoided or at least minimized. In this way, the body may be securely held without causing internal stress.

A preferred TIR body may in particular be of generally flat shape, i. e. with a width and/or length that is more than twice, preferably more than four times as large as the thickness, e. g. extension in height direction of the TIR body.

An upper and lower surface portion of the TIR body may be substantially flat. The two surface portions may be substantially plane and parallel. It is particularly preferred to arrange the TIR body such that regions of contact between the protrusions and the outer surface are at least substantially arranged in two planes, preferably parallel planes. In particular, the two planes may be at least substantially parallel to an optical axis.

The optical device may comprise further optical elements besides the TIR body. In particular, at least one lens element may be arranged to receive light emitted from the TIR body at an output portion. The lens element may also be held by the same housing as the TIR body, to achieve a low part count. In particular, the lens may be held between different housing portions, e. g. clamped between an upper and a lower housing portion. The housing may comprise an opening through which light may be emitted. The lens element may be provided within such an opening of the housing.

Preferably, the number of protrusions contacting the TIR body is relatively small to reduce distortion. For example, a TIR body may be held by only one or two protrusions from each side. However, as will be shown with respect to preferred embodiments, the shape of a TIR body may be more complex and comprise not only one, but two or more light input portions (and, preferably, respective light output portions, defining plural optical axes). Generally, it is preferred that 2-12 protrusions are provided per input portion, preferably 4-8. For a housing comprising upper and lower portions, 1-6 and preferably 3-4 protrusions on each housing portion may be provided per input portion.

In preferred embodiments, the protrusions may have at least substantially cylindrical shape, e.g. with circular or other cross-sectional shape. Alternatively, the protrusions may be shaped differently, e.g. as flat fins, cones or pyramid-shaped. They may be arranged e. g. to extend at least substantially perpendicular to the optical axis. It is particularly preferred to provide the protrusions with a head, preferably thinner than a shaft portion, comprising e. g. a rounded or at least partially tapered shape to reduce the contact area. The top area of the protrusions which is arranged to contact the TIR body may e.g. be plane (but preferably smaller than the cross-section of the protrusion shaft), or have convex shape. The protrusions may be arranged at least substantially perpendicular to a housing wall.

An optical device according to the invention may in particular be used in a headlighting assembly, i. e. to be used as front lighting of a vehicle. Different types of light sources may be used, such as e.g. one or more LED elements or laser lighting elements, for example one or more phosphor elements arranged to be activated by one or more laser beam source. Light emitted from an output portion of the optical device may directly be used as a front lighting beam, or additional optical elements such as e. g. one or more lenses may be provided to further alter the beam shape.

These and other aspects of the invention will become apparent from and elucidated with reference to the embodiment described hereinafter.

BRIEF DESCRIPTION OF THE DRAWINGS

In the drawings,

FIG. 1 shows a perspective view of a headlighting assembly according to an embodiment of the invention;

FIG. 2 shows a top view of the headlighting assembly with an upper housing portion taken off;

FIG. 3 shows a schematical partial view of a light beam reflected within a TIR body in the headlighting assembly according to FIG. 1, FIG. 2;

FIG. 4 shows a perspective exploded view of the headlighting assembly according to FIG. 1, FIG. 2.

DETAILED DESCRIPTION OF EMBODIMENTS

FIG. 1 shows a headlighting assembly 10 in a perspective view. The headlighting assembly comprises a housing 12 comprised of an upper housing portion 12a and a lower housing portion 12b.

A double lens element 14 is provided at a front of the head lighting assembly 10, held by the housing 12.

FIG. 2 shows a top view of the head lighting assembly 10 with the upper housing portion 12a taken off. As shown, a TIR body 16 is arranged within the housing 12. Input collimating portions 22a, 22b of the TIR body 16 protrude through openings of the housing 12 such that light input surfaces 24a, 24b are arranged in front of two LED light sources 18a, 20a provided on circuit boards 20a, 20b.

The TIR body 16 is comprised of two substantially identically shaped elements 16a, 16b arranged side by side. Each of the TIR elements 16a, 16b comprises a collimator portion 22a, 22b including a light input surface 24a, 24b arranged opposite the respective LED light source 18a, 18b. At the opposite end of each TIR element 16a, 16b a light output portion in the shape of a curved light output surface 26a, 26b is arranged.

As schematically shown in FIG. 2, light from the LED light sources 18a, 18b enters each of the TIR elements 16a, 16b of the TIR body 16 through the input surfaces 24a, 24b at the input collimators 22a, 22b. The light is guided internally within the TIR body 16 such that beams are emitted at the light output surfaces 26a, 26b. The emitted beam is projected by the double lens element 14 to form an illumination beam.

FIG. 3 schematically shows how light is conducted within the solid transparent TIR body 16. As schematically shown, light guided within the TIR body 16 is reflected at an upper and lower outer surface 28a, 28b of the TIR body 16 due to total internal reflection.

The shape of the TIR body 16 is also shown in the exploded view of FIG. 4. As described, the TIR body 16 is of generally flat shape with generally plane upper and lower surfaces. The skilled person will understand that the flat shape of the upper and lower surfaces 28a, 28b of the TIR body 16 is shown here to more easily understand the central aspects of the present invention related to mounting of the TIR body 16, while in actual embodiments the shape may differ according to optical considerations, e.g. be provided with raised or lowered portions. Thus, the upper and lower surfaces here referred to as "generally plane" and "generally parallel" may in actual embodiments have a more complex shape to achieve desired optical effects, the specifics of which are outside of the scope of the present invention.

In operation of the LEDs 18a, 18b the TIR body 16 serves to achieve a desired beam shape and intensity distribution for a vehicle front light to be emitted through the lens 14. While the major portion of the light from the LEDs 18a, 18b it is guided within the interior of the TIR body 16 and reflected at its outer surfaces 28a, 28b as schematically shown in FIG. 3, there will generally be certain scattered portions of the light which are emitted from the interior of the TIR body 16, such as schematically indicated by a slash-dotted line in FIG. 3. Such scattered light portions emitted at locations outside of the light output surfaces 26a, 26b are absorbed by the housing 12.

As shown in the figures, the housing 12 comprises housing walls 38a, 38b from which a plurality of protrusions 30 extend into the direction of the TIR body. The protrusions 30 shown in the example are of cylindrical shape with circular cross section. They are formed integrally with the housing 12 to extend substantially perpendicularly from the housing walls 38a, 38b.

As shown in FIG. 3, the protrusions 30 thus establish a distance between the outer surfaces 28a, 28b of the TIR body 16 and the substantially parallel housing walls 38a, 38b. The protrusions 30, as shown in the example, are provided with rounded heads 32.

As shown in the figures, both the upper and lower housing portions 12a, 12b are provided with protrusions 30. The TIR body 16 is thus held by protrusions 30 abutting with their heads 32 against the outer surfaces 28a, 28b from above and below, i.e. from opposing directions. In addition, protrusions 36 are provided projecting from side wall portions of the housing 12 contacting the TIR body 16 from opposing directions to establish a defined position of the TIR body 16. Further protrusions (not shown in FIG. 2) may be provided to abut against the TIR body 16 from different directions, such as front and back, such that it is securely positioned in all axes.

The protrusions are spaced from one another. In the example shown, seven upper and lower protrusions are provided on each housing portion 12a, 12b. The heads 32 of the protrusions 30, 36 are the only points of contact between the housing 12 and the TIR body 16. Thus, the contact surface of housing parts against the outer surfaces 28a, 28b of the TIR body is minimized. Due to the rounded heads 32, each protrusion 30, 36 only leads to a point-shaped contact area. Thus, any influence on the optical properties of the TIR body 16 is minimized. In addition, due to the same number of protrusions provided on both sides, any influence of the optical properties will be at least substantially symmetrical.

The TIR body 16 and the lens 14 are both fixed between the housing portions 12a, 12b. The alignment of the housing portions 12a, 12b on top of each other is achieved by form-fitting elements 34 provided in the corners of the upper and lower housing portions 12a, 12b.

It should be noted that the above-mentioned embodiments illustrate rather than limit the invention, and that those skilled in the art will be able to design many alternative embodiments without departing from the scope of the appended claims. For example, the number and shape of the protrusions described above, as well as the shape of the TIR body may differ. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. An optical device comprising:
   a generally flat body of a transparent material comprising at least one light input portion configured to receive light, and an outer surface configured to reflect at least a portion of the light due to total internal reflection, the outer surface further comprising at least one light output portion configured to emit the reflected light and an upper surface portion and a lower surface portion substantially parallel; and
   a non-transparent housing at least partially covering the body, the housing comprising:
   housing walls arranged at a distance from the body, and
   a plurality of protrusions extending from the housing walls and abutting against the upper surface portion and the lower surface portion of the body to hold the body within the housing.

2. The optical device according to claim 1, wherein the housing comprises at least an upper and a lower housing portion, the body being arranged between the upper and lower housing portions, wherein the protrusions are arranged both at the upper and lower housing portions extending to abut against the body.

3. The optical device according to claim 2, wherein the housing portions are connected by one or more form-fitting elements.

4. The optical device according to claim 1, wherein the housing comprises a housing wall arranged at a distance from the body, the protrusions being arranged between the housing wall and the body.

5. The optical device according to claim 1, wherein the body is clamped between the protrusions abutting against the surface at opposite sides.

6. The optical device according to claim 1, wherein regions of contact between a plurality of the protrusions and the outer surface are at least substantially arranged in two planes.

7. The optical device according to claim 1, wherein at least one lens element is arranged to receive light emitted from the body at an output portion thereof.

8. The optical device according to claim 7, wherein the at least one lens element is provided in an opening of the housing.

9. The optical device according to claim 1, wherein the body comprises one or more of the light input portions, and the housing comprises 2-12 of the protrusions per light input portion.

10. The optical device according to claim 1, wherein the housing comprises at least an upper and a lower housing portion, the body being arranged between the upper and lower housing portions, wherein 1-6 protrusions per light input portion are arranged at the upper housing portion, and 1-6 protrusions per light input portion are arranged at the lower housing portion.

11. The optical device according to claim 1, wherein the protrusions have an at least substantially cylindrical shape.

12. The optical device according to claim 1, wherein the protrusions are provided with a rounded or at least partially tapered head arranged to abut against the outer surface.

13. The optical device according to claim 1, wherein the body is held only by the protrusions without contacting other parts of the housing.

14. A headlighting assembly comprising:
   at least one light source;
   a generally flat body of a transparent material comprising at least one light input portion configured to receive light from the at least one light source, and
   an outer surface configured to reflect at least a portion of the light due to total internal reflection, the outer surface further comprising at least one light output portion configured to emit the reflected light and an upper surface portion and a lower surface portion substantially parallel; and
   a non-transparent housing at least partially covering the body, the housing comprising:
   housing walls arranged at a distance from the body, and
   a plurality of protrusions extending from the housing walls and abutting against the upper surface portion and the lower surface portion of the body to hold the body within the housing.

15. The headlighting assembly according to claim 14, wherein the light source comprises at least one LED element or at least one laser lighting element.

16. The headlighting assembly according to claim 14, wherein the housing comprises at least an upper and a lower housing portion, the body being arranged between the upper and lower housing portions wherein the protrusions are arranged both at the upper and lower housing portions extending to abut against the body.

17. The headlighting assembly according to claim 14, wherein the housing comprises a housing wall arranged at a distance from the body, the protrusions being arranged between the housing wall and the body.

18. The headlighting assembly according to claim 14, wherein the body is clamped between the protrusions abutting against the surface at opposite sides.

19. The headlighting assembly according to claim 14, wherein regions of contact between a plurality of the protrusions and the outer surface are at least substantially arranged in two planes.

20. The headlighting assembly according to claim 14, wherein at least one lens element is arranged to receive light emitted from the body at an output portion thereof.

* * * * *